United States Patent [19]

Wahl

[11] Patent Number: 4,964,843
[45] Date of Patent: Oct. 23, 1990

[54] POWER TRANSMISSION UNIT FOR VARIABLE-SPEED DRIVE OF MACHINERY

[75] Inventor: Georg Wahl, Crailsheim, Fed. Rep. of Germany

[73] Assignee: Voith Turbo GmbH & Co. KG, Crailsheim, Fed. Rep. of Germany

[21] Appl. No.: 381,125

[22] Filed: Jul. 14, 1989

[30] Foreign Application Priority Data

Jul. 14, 1988 [DE] Fed. Rep. of Germany ....... 3823793

[51] Int. Cl.$^5$ .............................................. F16H 47/08
[52] U.S. Cl. ....................................... 475/34; 475/50; 475/69; 475/71
[58] Field of Search ................. 74/677, 687, 688, 681, 74/720, 730; 475/34, 47, 49, 50, 59, 64, 69, 71

[56] References Cited

U.S. PATENT DOCUMENTS

| | | | |
|---|---|---|---|
| 2,924,992 | 2/1960 | Edsall | 74/677 |
| 2,982,152 | 5/1961 | De Lorean | 74/688 |
| 3,500,704 | 3/1970 | Müller et al. | 74/688 |
| 4,099,426 | 7/1978 | Keller et al. | 74/730 |
| 4,726,255 | 2/1988 | Humpfer et al. | 74/681 X |

FOREIGN PATENT DOCUMENTS

| | | | |
|---|---|---|---|
| 885427 | 9/1943 | France | 74/720 |
| 670765 | 6/1979 | U.S.S.R. | 74/677 |
| 1353964 | 11/1987 | U.S.S.R. | 74/688 |
| 1208831 | 10/1970 | United Kingdom | 74/688 |

*Primary Examiner*—Dwight Diehl
*Assistant Examiner*—Benjamin Levi
*Attorney, Agent, or Firm*—Jeffers, Hoffman & Niewyk

[57] ABSTRACT

In a power-transmission unit for variable-speed drive of machinery with hydro-dynamic speed-superposition of a differential gear a second torque converter is provided as a braking device. This increases the effectiveness of the unit by feedback of the superposed output onto the drive side. Particularly advantageous is the use of an oppposed-motion converter as brake converter for certain operating conditions or the combination of a with-motion converter and an opposed-motion converter in the unit. Furthermore, this makes an extension of the speed control range possible.

11 Claims, 1 Drawing Sheet

POWER TRANSMISSION UNIT FOR VARIABLE-SPEED DRIVE OF MACHINERY

BACKGROUND OF THE INVENTION

The invention relates to a power-transmission unit for variable-speed drive of machinery.

Such a power transmission unit is known from German patent document No. 34 41 877. It serves to drive machinery with variable speed under initially constant speed of the drive unit. An input shaft is connected on the one side to the drive unit and on the other side to a differential gear, either directly or by way of a load-variable hydraulic coupling. The gear output shaft which is connected to the machinery is also coupled to the differential gear. To achieve a variable output speed, an adjustable hydro-dynamic torque converter is provided, the pump wheel of which is also connected to the differential gear together with the input shaft and its turbine wheel via a brakeable shaft. For braking, the rotor of a load-degree variable brake is connected to the turbine-wheel shaft so that varying speeds can be set both at the turbine-wheel shaft (superposed shaft) and hence at the gear output. The hydrodynamic brake also serves as a freewheel unit, and it is possible without wear and in constant operation to even have the superposed shaft rotate in reverse at low speed.

In all working conditions, however, the operation of the hydro-dynamic brake is associated with torque support against the stationary housing which is, in effect, a complete conversion of the corresponding rotational energy at the turbine-wheel shaft into heat. Thereby, the power portion directed by the torque converter into the differential gear, and hence the power portion maximally converted in the brake is relatively small as the major portion of it is transmitted directly. However, it is uneconomical on a long-term basis to continuously convert a certain power portion into heat, apart from the necessity of continuously having to dispose of this heat. Particularly during high speed operation of the brake rotor, large amounts of heat must be expected.

SUMMARY OF THE INVENTION

It is thus the aim of the invention to further develop the known power-transmission unit in such a way that its degree of effectiveness and its speed control range are widened.

This aim is achieved according to the characteristics of the invention, in that a further hydro-dynamic torque converter is provided in lieu of a hydro-dynamic brake to act as a braking device for the turbine-wheel shaft of the one torque converter, which turbine-wheel shaft is connected to the differential gear. The input capacity as demanded by the pump wheel of the additional torque converter then equals the power so far fed to the brake rotor, but is again fed into the power-transmission unit with another speed and torque ratio. This results, on the one hand in the desired braking at the differential gear or at the turbine-wheel shaft of the first torque converter respectively, and on the other hand in a simultaneous feedback of power into the power path. A total loss of energy as during the use of a hydro-dynamic brake, does not occur. At the same time, the speed-control range is widened as a torque converter does not only develop high torque at low speed, but can also be driven in reverse with increased brake torque.

Advantageous further aspects of the invention are described below. The second torque converter is here preferred to be constructed as an opposed-motion converter for pump's or turbine's opposed rotational direction and accommodated coaxially axially to the first torque converter. Thereby, the construction as a regulating converter with guide-blade control and/or a device for altering the load can again be provided. It is preferred to connect the pump wheel of the second torque converter to the turbine wheel of the first, and the turbine wheel of the second to the pump wheel of the first. This results in particularly economical feedback of the energy taken to brake by the pump wheel from the differential gear via the turbine wheel of the second torque converter onto the input shaft. Such an opposed-motion converter can preferably have a turbine wheel with axial flow-through.

Furthermore, the construction can be such that the first torque converter is an opposed-motion converter and the second is a with-motion converter. In this way, a convertor type with more suitable blade equipment can be used for braking of a differential gear.

Further constructional arrangements according other aspects of the invention relate to the accommodation of the second torque converter in the housing of the power-transmission unit as well as the advantageous kinematic coupling onto the gear with constant ratio and onto the differential gear.

BRIEF DESCRIPTION OF THE DRAWINGS

Specific embodiments of the present invention will now be described by way of example only and with reference to the accompanying diagrammatic drawings in which.

DESCRIPTION OF THE PREFERRED EMBODIMENT

Figure 1:
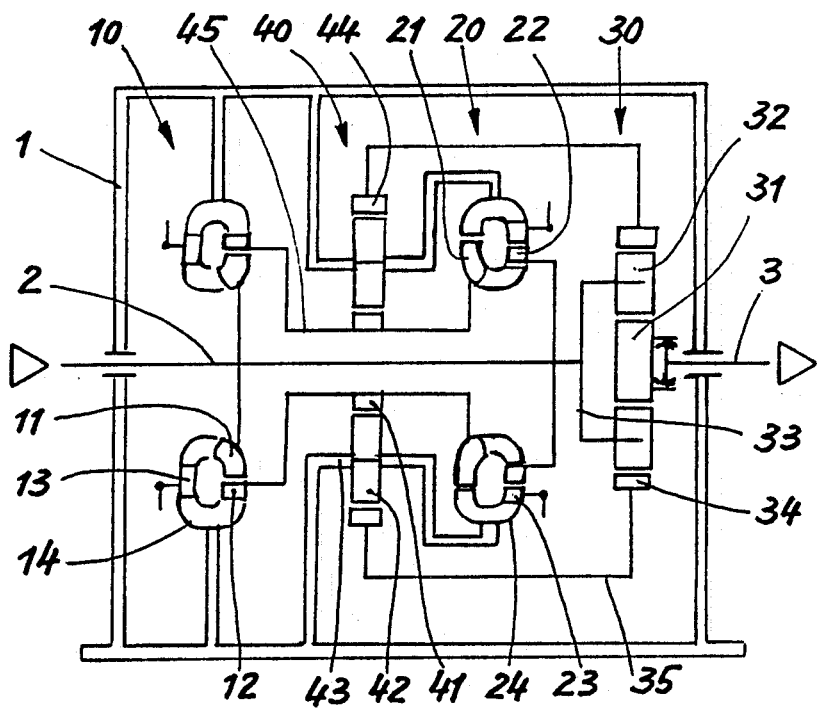
FIG. 1 shows a schematic longitudinal section through the power transmission unit.

FIG. 1 shows in schematic longitudinal section a power-transmission unit built into a housing 1, including an input shaft 2 which is connected with a not illustrated) drive or a preceding hydraulic coupling. The pump wheel 11 of a first torque converter 10 placed co-axially thereto is disposed on the input shaft 2. The input shaft 2 extends up to a differential gear 30 which is a planetary gear, thus driving the planet carrier 33. The sun gear 31 is connected with an output shaft 3 which leads to (not illustrated) machinery. An internal gear 34 embraces the planet wheels 32 of the differential gear 30. The first torque converter 10 preferably has a fixed housing 14 which is connected with the housing 1.

Between the first torque converter 10 and the differential gear 30, there is a further planetary gear 40 with fixed ratio and with a fixed planetary carrier 43 and pinion gears 42. Pinion gears 42 connect sun gear 41 with gear 44. The internal gear 44 of said gear 40 has rotating contact with the internal gear 34 of the differential gear 30 via a rotating shell 35. The sun gear 41 of the planetary gear 40 is connected with the turbine wheel 12 of the first torque converter 10 via a superposed shaft 45.

Inside the rotating shell 35 between the two internal gears 34 and 44, there is a further torque converter 20, disposed coaxially to input shaft 2. The housing 24 of the torque converter 20 is attached to the fixed planet carrier 43 of the pinion gear 40, and thus to the housing 1. The pump wheel 21 of this second torque converter 20 is coupled to the sun gear 41 of the pinion gear 40 via the superposed shaft 45, and thus also to the turbine wheel 12 of the first torque converter 10. The turbine wheel 22 of the second torque converter 20 is connected with the input shaft 2 and thus with the pump wheel 11 of the first torque converter 10 and the embracing planet carrier 33 of the differential gear 30. Both torque converters 10 and 20 are preferably equipped with a device for changing the filling with hydraulics medium and with adjustable guide blades 13, 23.

As with the known power-transmission, power transmission during normal continuous operation occurs with an emptied first torque converter 10. Thereby, the second torque converter 20 is activated by way of controlled load or selected guide-blade positioning so that the internal gear 34 of the differential gear adopts a speed corresponding to the desired output speed. Thereby, the pump wheel 21 of the second torque converter picks up output from the internal gear of the differential gear 30 which is initiated via the pinion gear 40.

According to the speed of the input shaft 2, a certain speed relation between turbine wheel 22 and pump wheel 21 develops in the second torque converter 20, which relation is decisive for the developed brake and drive moment and thus also for a possible output feedback into input shaft 2. Only a small fraction of output circulates in bypass between the internal gear 34 of the differential gear 30 and the turbine wheel 22 of the second torque converter whereby natural losses in the torque converter are considerably lower than those of the hydraulic brake in the known power-transmission unit.

If the speed of the output shaft 3 is to be changed, in particular increased, then, as is known, the first torque converter 10 is loaded whilst the second torque converter 20 is at least partially emptied, so that the entire output is fed to the differential gear 30, to a smaller extent via the torque converter 10 and the pinion gear 40, and to a larger extent direct via the input shaft 2.

Furthermore, operation of the power-transmission unit with preceding hydraulics coupling and possibly a bridging coupling is executed as with the known constructions.

Figure 2:
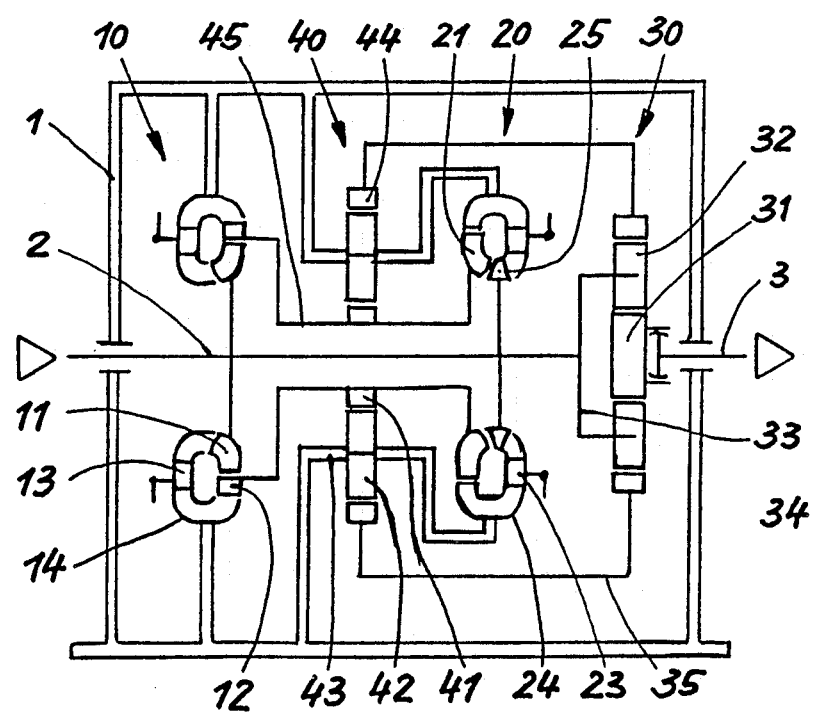
FIG. 2 shows a longitudinal section as in FIG. 1 but with alternative converter type.

Both the guide wheel 23 (with guide-blade adjustment) and the adjacent turbine wheel 22 of the second torque converter 20 as shown in FIG. 1 have centripetal flow-through, that is, flow from radially outward to radially inward. FIG. 2 illustrates another converter type including a turbine wheel 25 with axial flow-through. The remaining components of the illustrated units are identical with those in FIG. 1, being assigned the same reference numbers. The advantage of an axial turbine 25 is that this type is particularly suitable as opposedmotion converter, i.e., for rotation of pump 21 in a direction opposed to that of turbine 25. If, as is the case in the present application, the braking effect of the second torque converter 20 on the internal gear of the differential gear 30 is of particular significance, then the selection of an opposed-motion converter is preferred, which opposed-motion converter produces the desired high brake torque transfer during with-motion rotation of pump wheel and turbine wheel. By constructing the pinion gear 40 as a gearing, the sun gear 41 will always run in opposed motion to the internal gear 44 whereas the superposed shaft 45 rotates with turbine wheel 12 of the first torque converter 10 in the same direction as the input shaft 2 and the pump wheel 11. By such an arrangement of a with-motion converter 10 with reversing gearing 40, the speed superposition required for a speed increase at the output shaft 3 is created. The combination of a with-motion converter with an opposed-motion converter as braking means is advantageous as same can be constructed to be small and can be accommodated within the rotating shell.

It is equally principally thinkable to construct the first torque converter to be an opposed-motion converter and the second to be a with-motion converter with corresponding construction of the pinion gear 40. Furthermore, it is thinkable to construct both torque converters as with-motion converters or as opposed-motion converters, but this requires accommodation of the pinion gear 40 accordingly.

It is furthermore possible to displace the two torque converters alongside each other in front of the pinion gear 40. However, one of the torque converters would then have to be a socalled through-force converter through which the turbine rotation of the other torque converter is directed. However, such a construction is much involved and produces increased hydraulic losses.

By building a torque converter into the known power-transmission unit, its speed control range is extended by up to approximately 30 to 100 percent of the output speed. This is achieved by clever utilization of the characteristic line of a torque converter which line is in principle different from a hydro-dynamic brake, which particularly leads to increased effectiveness.

What is claimed is:

1. A power-transmission unit for variable speed drive of machinery, comprising:
   an input shaft;
   an output shaft coaxial with said input shaft;
   a first fillable and dischargeable hydro-dynamic torque converter having a turbine wheel and a pump wheel, said pump wheel being connected with said input shaft;
   a braking device including a second hydro-dynamic torque converter having a turbine wheel and a pump wheel, the turbine wheel of said second torque converter being connected to said input shaft for rotation as a unit;
   a differential gear arrangement having a first gear member connected with said input shaft, a second gear member permanently coupled to said output shaft, and a third gear member; and
   coupling means for coupling said third gear member to the turbine wheel of said first torque converter and to said braking device, said coupling means including a gear transmission with constant ratio disposed between said differential gear arrangement and said first torque converter, and a shaft superposed on and arranged coaxially to said input shaft;
   the pump wheel of said second torque converter being in continuous rotary connection with the turbine wheel of said first torque converter, and the turbine wheel of said second torque converter being in continuous rotary connection with the pump wheel of said first torque converter;
   said gear transmission being a planetary gear arrangement having a ring gear connected to said third gear member of said differential gear arrangement and, establishing through the constant gear ratio, a connection to said superposed shaft.

2. Power-transmission unit according to claim 1, in which the second torque converter is disposed co-axially to the first torque converter.

3. Power-transmission unit according to claim 1, in which the second torque converter is a regulating converter with guideblade control.

4. Power-transmission unit according to claim 1, in which the second torque converter is constructed to be fillable and dischargeable.

5. Power-transmission unit according to claim 1, in which the second torque converter turbine wheel has axial flowthrough.

6. Power-transmission unit according to claim 1, in which the gear transmission with constant ratio is a planetary gear with a fixed planet carrier and is disposed between the two torque converters.

7. Power transmission unit according to claim 1, in which a housing of the second torque converter is connected with a planetary carrier of said gear transmission.

8. Power-transmission unit according to claim 1, in which one of the torque converters is a with-motion converter, the other being on opposed-motion converter.

9. Power-transmission unit according to claim 8, in which the second torque converter is an opposed-motion converter including said pump wheel and said turbine wheel of the second torque converter and a blade arrangement for opposed-motion rotation of the pump wheel against the turbine wheel of the second torque converter.

10. Power-transmission unit according to claim 8, in which the pump wheel of the opposed-motion converter and the turbine of the with-motion converter are disposed on the superposed shaft, which superposed shaft is an internal shaft for a sun gear of the gear transmission with constant ratio, said superposed shaft being hollow.

11. Power-transmission unit according to claim 8, in which the pump wheel of the with-motion converter and the turbine wheel of the opposed-motion converter are disposed on the input shaft.

* * * * *